UNITED STATES PATENT OFFICE.

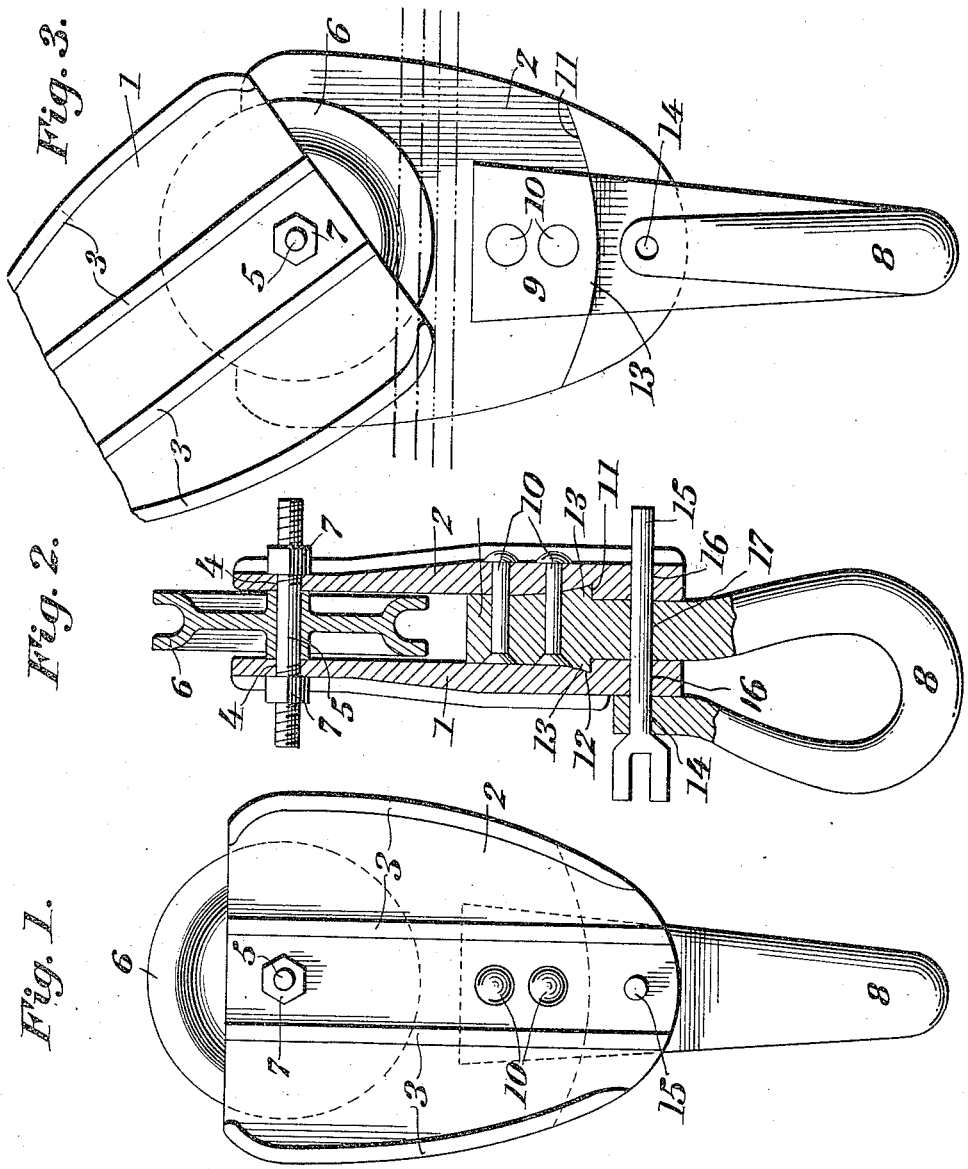

GEORGE D. HARDING, OF MARSHFIELD, OREGON.

PULLEY.

1,195,215.   Specification of Letters Patent.   Patented Aug. 22, 1916.

Application filed March 31, 1916. Serial No. 88,082.

*To all whom it may concern:*

Be it known that I, GEORGE D. HARDING, a citizen of the United States, residing at Marshfield, in the county of Coos and State of Oregon, have invented certain new and useful Improvements in Pulleys, of which the following is a specification.

This invention relates to pulleys and more particularly to the class of pulleys which are known as snatch blocks and the primary object of the invention is to provide a snatch block that may be employed to receive the bight of a cable or rope without the necessity of reeving the end of a cable or rope through the snatch block as is required by most devices of this character.

The invention further aims to provide a snatch block that will have its shell-sections mounted in a manner that will allow one of the sections to be swung on a pivot whereby a rope or cable may be inserted in the hook of the snatch block or in the groove of the pulley carried thereby.

The invention further contemplates the provision of means for strengthening the shank of the hook in its relative position between the shell-sections of the block which will prevent the hook from being withdrawn or accidentally parted from the shell-sections when a great stress is applied to the rope or cable.

A further object of the invention is the provision of a pulley which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which—

Figure 1 is a side elevation. Fig. 2 is a vertical transverse section. Fig. 3 is a side elevation showing the pivoted shell-section in open position.

The shell-sections 1 and 2 are substantially of the same formation and are provided with ridges 3 on their outer faces to add strength to their construction. The upper ends of the shell-sections are provided with apertures 4 through which is extended the pivot bolt 5 and mounted upon the pivot bolt between the inner faces of the shell-sections 1 and 2 is the pulley 6 which is provided with the usual grooves for receiving the rope or cable. The ends of the pivot bolt 5 are provided with screw threads for receiving the nuts 7 whereby the bolt may be secured in position in the apertures of the shell-sections.

A hook 8 is provided which has its shank 9 secured to the shell-section 2 by means of rivets 10 and the inner faces of the shell-sections 1 and 2 are provided with grooves 11 and 12 into which are received the tongues 13 which are formed upon the sides of the shank 9 whereby a great stress or violent pull on the cable or rope, which is attached to the hook 8, will not cause the hook to be sheared from its fastening means which holds it to the shell-section 2. These tongues and grooves add materially to the strength of the device and are curved as shown by Fig. 3 of the drawing to allow the pivoted shell-section 1 to rotate upon its pivot and be moved out of engagement with the tongue 13. The end of the hook 8 is constructed so that its upper end will contact with the lower end of the shell-section 1 and is provided with an aperture 14 for the reception of a locking pin 15 which is extended through apertures 16 formed in the lower ends of the shell-sections 1 and 2 and also through an aperture 17 which is in a line with the apertures 14, 15 and 16 and is formed in the shank of the hook.

It will be observed that the device may be easily and quickly attached to the bight or a rope or cable by simply removing the locking pin 15 and swinging the shell-section 1 upon the bolt 5 which acts as a pivot for the shell-section, whereby the cable or rope may be inserted in the groove in the pulley or in the loop of the hook 8. The shell-section 1 is then swung into closed position and the locking pin 15 thrust through the apertures 14, 15, 16 and 17 which will prevent any accidental displacement from either the pulley or the hook.

From the foregoing it will be observed that a very simple and durable pulley has been provided, the details of which embody the preferred form. I desire it to be understood, however, that slight changes or modifications in the minor details of construction may be made without departing from the spirit of the invention or the scope of the claims hereunto appended.

I claim:

1. In a snatch block, the combination with a stationary and a pivoted shell-section of the block, of a hook having its shank secured to the stationary shell-section and provided with tongues, each of said shell-sections having grooves into which said tongues are adapted to be received.

2. In a snatch block, the combination with a stationary and a pivoted shell-section of the block, of a hook having a shank mounted between the shell-sections and provided with tongues on each of its sides, said shell-sections provided with grooves adapted to receive said tongues.

3. In a snatch block, the combination with a stationary and a pivoted shell-section, of a hook having its shank secured to the stationary shell-section and provided with an aperture, said shell-sections provided with apertures adapted to aline with the aperture in the shank of said hook, the end of said hook also being provided with an aperture adapted to register with the apertures in said shell-sections and in the shank of said hook, and a locking pin mounted in said apertures.

4. In a snatch block, the combination with a stationary and a pivoted shell-section of the block, of a hook having its shank secured to the stationary shell-section and provided with tongues, each of said shell-sections having grooves into which said tongues are received, the end of said hook provided with an aperture and the ends of said sections also provided with apertures adapted to aline with the said aperture in the end of said hook, the shank of said hook also provided with an aperture adapted to aline with the apertures in said sections, and a locking pin mounted in said apertures.

5. In a snatch block, the combination with the stationary and a pivoted shell-section of the block, and a hook having its shank disposed between said shell-sections, the inner faces of each of said shell-sections being provided with arcuate grooves, rivets extended through said shank and fastened to one of said shell-sections, tongues integrally formed with said shank and extending into said grooves.

6. In a snatch block, the combination with a stationary and a pivoted shell-section of the block, each of said sections provided with an aperture, of a hook having its shank secured to the stationary shell-section, means connecting said shank and said shell-sections for preventing the shearing of said shank from its securing elements, said shank being also provided with an aperture adapted to aline with the apertures in said sections, and a locking pin extending through said apertures.

7. In a snatch block, the combination with a stationary and a pivoted shell-section of the block, of a hook having a shank mounted between the shell-sections and provided with tongues on each of its sides, said shell-sections provided with grooves adapted to receive said tongues, and means for locking said pivoted shell-section in operative position.

8. In a snatch block, the combination with a stationary and a pivoted shell-section of the block, of a hook having its shank riveted to the stationary shell-section, said hook having its free end contacting with the outer face of said pivoted section, a locking pin adapted to secure the end of said hook to said pivoted shell-section, and means connecting said shell-sections, and the shank of said hook for preventing said shank from being sheared from its fastening rivets.

9. In a snatch block, the combination with the stationary and a pivoted shell-section of the block, and a hook having its shank disposed between said shell-sections, the inner faces of each of said shell-sections being provided with arcuate grooves, rivets extended through said shank and fastened to one of said shell-sections, tongues integrally formed with said shank and extending into said grooves, a pivot bolt carried by said shell-sections, a sheave rotatably mounted on said pivot bolt, the center of said pivot bolt being a point from which said arcuate grooves in said shell-sections and the said tongues on said shank are struck.

In testimony whereof I affix my signature in presence of two witnesses.

GEORGE D. HARDING.

Witnesses:
DANIEL RITZMAN,
C. L. PENNOCK.

Copies of this patent may be obtained for five cents each, by addressing the "Commissioner of Patents, Washington, D. C."